United States Patent
Koshiba et al.

(10) Patent No.: US 11,811,285 B2
(45) Date of Patent: Nov. 7, 2023

(54) STATOR, ROTARY ELECTRIC MACHINE, AND WORK MACHINE

(71) Applicant: KOMATSU LTD., Tokyo (JP)

(72) Inventors: Atsuyoshi Koshiba, Tokyo (JP); Takaaki Kimura, Tokyo (JP); Kousuke Mikami, Tokyo (JP); Teiichirou Chiba, Tokyo (JP)

(73) Assignee: Komatsu Ltd., Tokyo (JP)

( * ) Notice: Subject to any disclaimer, the term of this patent is extended or adjusted under 35 U.S.C. 154(b) by 452 days.

(21) Appl. No.: 17/274,516

(22) PCT Filed: Aug. 16, 2019

(86) PCT No.: PCT/JP2019/032108
§ 371 (c)(1),
(2) Date: Mar. 9, 2021

(87) PCT Pub. No.: WO2020/066355
PCT Pub. Date: Apr. 2, 2020

(65) Prior Publication Data
US 2021/0344244 A1    Nov. 4, 2021

(30) Foreign Application Priority Data
Sep. 25, 2018 (JP) .................... 2018-179284

(51) Int. Cl.
*H02K 3/28* (2006.01)
(52) U.S. Cl.
CPC ...................... *H02K 3/28* (2013.01)

(58) Field of Classification Search
CPC ................ H02K 3/28; H02K 15/0421; H02K 3/00–3/528
See application file for complete search history.

(56) References Cited

U.S. PATENT DOCUMENTS

| | | | |
|---|---|---|---|
| 2011/0175472 A1* | 7/2011 | Koike | H02K 3/50 310/71 |
| 2014/0300236 A1 | 10/2014 | Takizawa et al. | |
| 2014/0300239 A1 | 10/2014 | Takizawa et al. | |
| 2014/0339948 A1 | 11/2014 | Matsuoka | |
| 2021/0167649 A1* | 6/2021 | Koga | H02K 15/067 |

FOREIGN PATENT DOCUMENTS

| | | |
|---|---|---|
| JP | 2013121183 | 6/2013 |
| JP | 2013138594 | 7/2013 |
| JP | 2013162570 | 8/2013 |
| JP | 2014225974 | 12/2014 |
| JP | 2017163754 | 9/2017 |
| JP | 2017184559 | 10/2017 |

* cited by examiner

*Primary Examiner* — Thomas Truong
(74) *Attorney, Agent, or Firm* — Fish & Richardson P.C.

(57) ABSTRACT

A stator includes a stator core and a coil wound around the stator core. The coil includes a basic coil segment including a pair of first legs and a first transition portion disposed on a first end surface side of the stator core, and a transition coil segment including a pair of second legs and a second transition portion. The second transition portion includes a pair of shoulders and a pair of second rising portions. An inclination angle of the second rising portion is larger than an angle of the shoulder with respect to a first end surface, so that the second transition portion is in contact with the first transition portion.

6 Claims, 8 Drawing Sheets

STATOR, ROTARY ELECTRIC MACHINE, AND WORK MACHINE

CROSS-REFERENCE TO RELATED APPLICATIONS

This application is a National Stage application under 35 U.S.C. § 371 of International Application No. PCT/JP2019/032108, filed on Aug. 16, 2019, which claims priority to Japanese Patent Application No. 2018-179284, filed on Sep. 25, 2018. The contents of the prior applications are incorporated herein in their entirety.

TECHNICAL FIELD

The present invention relates to a stator, a rotary electric machine, and a work machine.

BACKGROUND ART

There is a stator of a rotary electric machine, in which a coil is wound around a stator core in wave form. As illustrated in Patent Literature 1, in this type of stator, the coil includes a plurality of coil segments made of a rectangular wire. Each of the coil segments includes a pair of legs that extend parallel to each other in an axial direction of the stator core to be inserted into a pair of slots of the stator core, and a transition portion that connects the pair of legs and is disposed on one end surface side in the axial direction of the stator core.

In this type of stator, a wave winding coil can be produced by inserting the pair of legs of each of the coil segments into the pair of slots of the stator core from the one end surface side in the axial direction of the stator core, and then welding tip portions of the legs of two coil segments which are separate, the tip portions protruding from the other end surface side of the stator core. When the legs of the coil segments are welded together, if the positions of welding portions in the axial direction of the stator core vary between a plurality of the welding portions in which two legs which are separate are welded together, the variation causes welding defects. Therefore, in order to suppress the variation, the transition portions protruding from one end surface of the stator core are required to be pressed toward the one end surface of the stator core.

CITATION LIST

Patent Literature

Patent Literature 1
Japanese Unexamined Patent Application, First Publication No. 2017-184559

SUMMARY OF INVENTION

Technical Problem

By the way, the coil segment forming the coil includes a basic coil segment and a transition coil segment. A transition portion of the transition coil segment is disposed such that transition portions of part of the basic coil segments are located between the transition portion and the one end surface of the stator core in the axial direction of the stator core. However, in the stator of the related art, the transition portion of the transition coil segment is located apart from the transition portions of the part of the basic coil segments by an interval in the axial direction. For this reason, when the coil segments are welded together, the part of the basic coil segments may not be able to be pressed toward the one end surface of the stator core.

The present invention has been made in view of such a problem, and an object of the present invention is to provide a stator in which even when a transition portion of a transition coil segment is disposed to overlap a transition portion of a basic coil segment, the transition portion of the basic coil segment can be reliably pressed toward a first end surface of a stator core, a rotary electric machine including the same, and a work machine.

Solution to Problem

According to one aspect of the present invention, a stator is provided including: a stator core including a plurality of teeth and a plurality of slots; and a coil wound around the plurality of slots at a predetermined pitch. The coil includes a basic coil segment including a pair of first legs that are inserted into a pair of first slots located apart from each other by a first interval in a circumferential direction of the stator core, and a first transition portion that connects the pair of first legs and is disposed on a side of a first end surface in an axial direction of the stator core, and a transition coil segment including a pair of second legs that are inserted into a pair of second slots located apart from each other in the circumferential direction by a second interval wider than the first interval, and a second transition portion that connects the pair of second legs and is disposed such that the first transition portion is located between the second transition portion and the first end surface in the axial direction. The first transition portion of the basic coil segment includes a pair of first rising portions that extend obliquely to be apart from the first end surface in the axial direction while the pair of first rising portions approach each other from the first legs in the circumferential direction. The second transition portion of the transition coil segment includes a pair of shoulders that extend from the second legs in a direction to approach each other, and a pair of second rising portions that extend obliquely to be apart from the first end surface in the axial direction while the pair of second rising portions approach each other from tips in an extending direction of the shoulders. An inclination angle of the second rising portion with respect to the first end surface is larger than an inclination angle of the shoulder with respect to the first end surface, so that the second transition portion is in contact with the first transition portion.

According to one aspect of the present invention, a rotary electric machine is provided including a rotor and the stator.

According to one aspect of the present invention, a work machine is provided including the rotary electric machine.

Advantageous Effects of Invention

According to the present invention, the first transition portion of the basic coil segment can be reliably pressed toward the first end surface of the stator core simply by pressing the second transition portion of the transition coil segment toward the first end surface of the stator core.

DESCRIPTION OF EMBODIMENTS

Hereinafter, one embodiment of the present invention will be described in detail with reference to FIGS. 1 to 8.

<Rotary electric machine>

Figure 1:
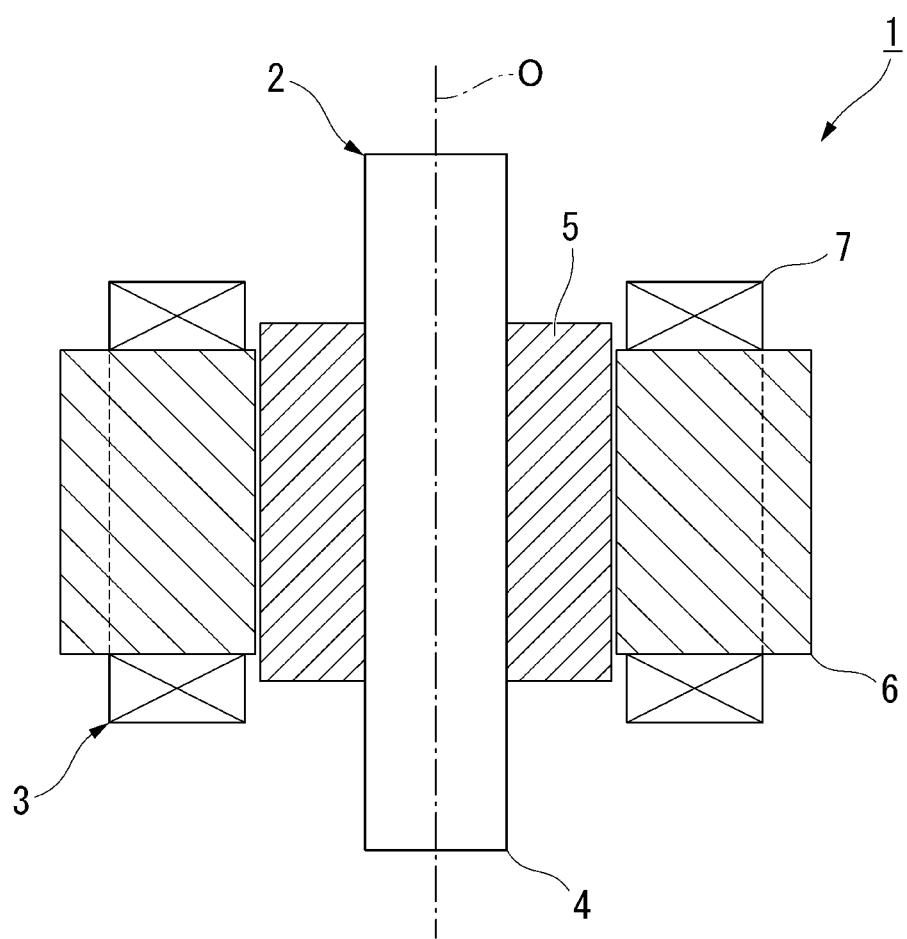
FIG. 1 is a cross-sectional view illustrating a rotary electric machine according to one embodiment of the present invention.

A rotary electric machine 1 illustrated in FIG. 1 is, for example, a three-phase alternating permanent magnet synchronous motor that drives an upper swing body to swing with respect to an undercarriage in a construction machine (unillustrated). The rotary electric machine 1 includes a rotor 2 and a stator 3.

The rotor 2 includes a rotor shaft 4 and a rotor core 5. The rotor shaft 4 is a rod-shaped member centered on an axis O. The rotor shaft 4 is provided so as to be rotatable around the axis O. The rotor core 5 is formed in a cylindrical shape centered on the axis O. The rotor core 5 is fixed to an outer peripheral surface of the rotor shaft 4.

<Stator>

Figure 2:
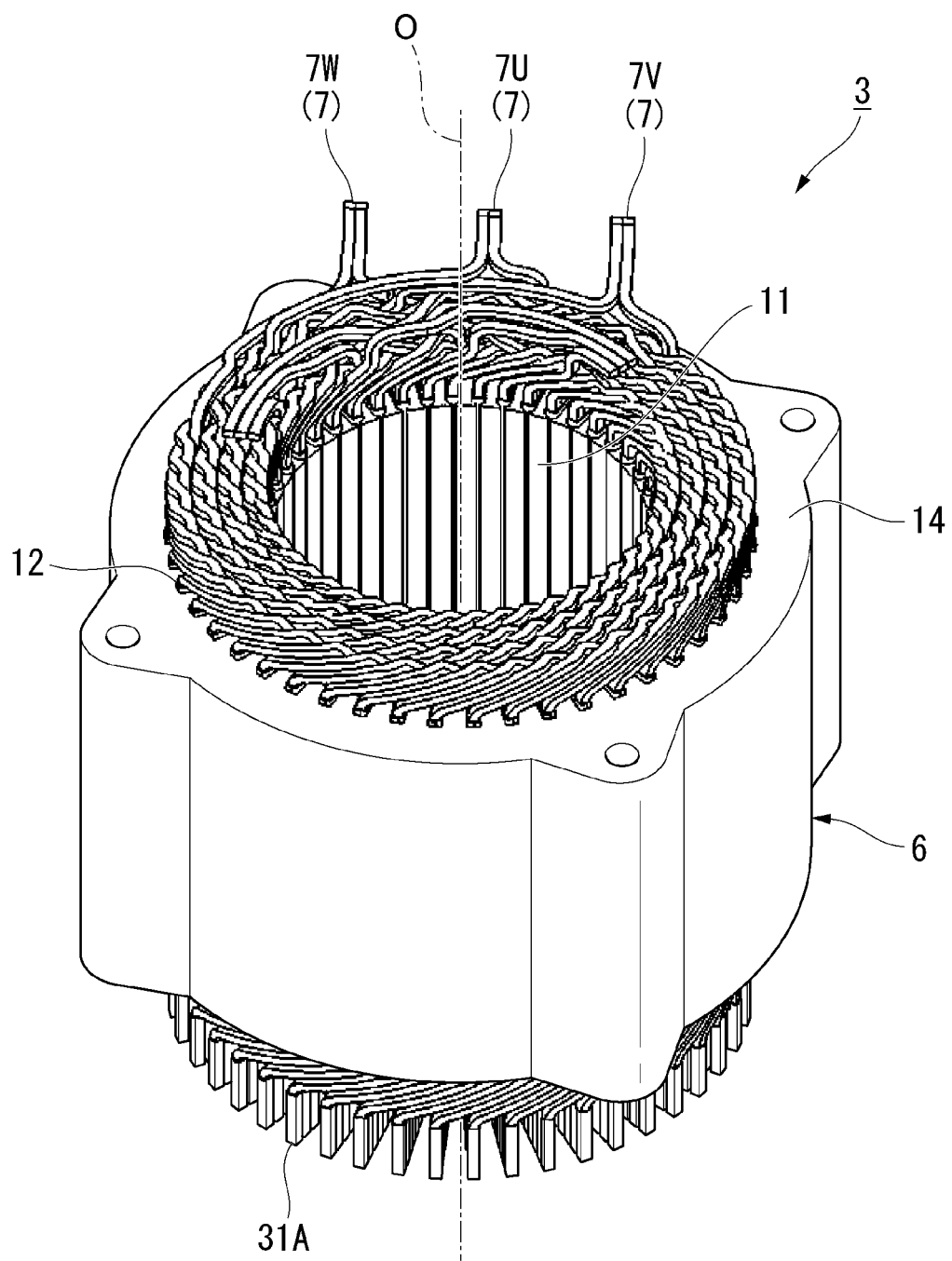
FIG. 2 is a perspective view illustrating a stator according to one embodiment of the present invention.

As illustrated in FIGS. 1 and 2, the stator 3 includes a stator core 6 and a coil 7.

<Stator core>

Figure 4:
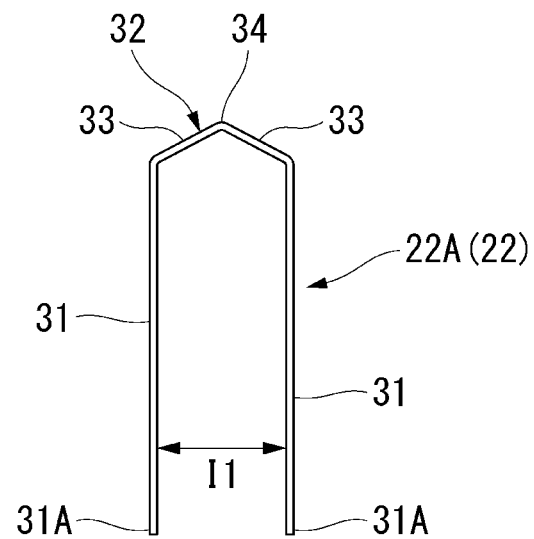
FIG. 4 is a perspective view illustrating a stator core and a basic coil segment forming the stator of FIG. 2.
Figure 4:
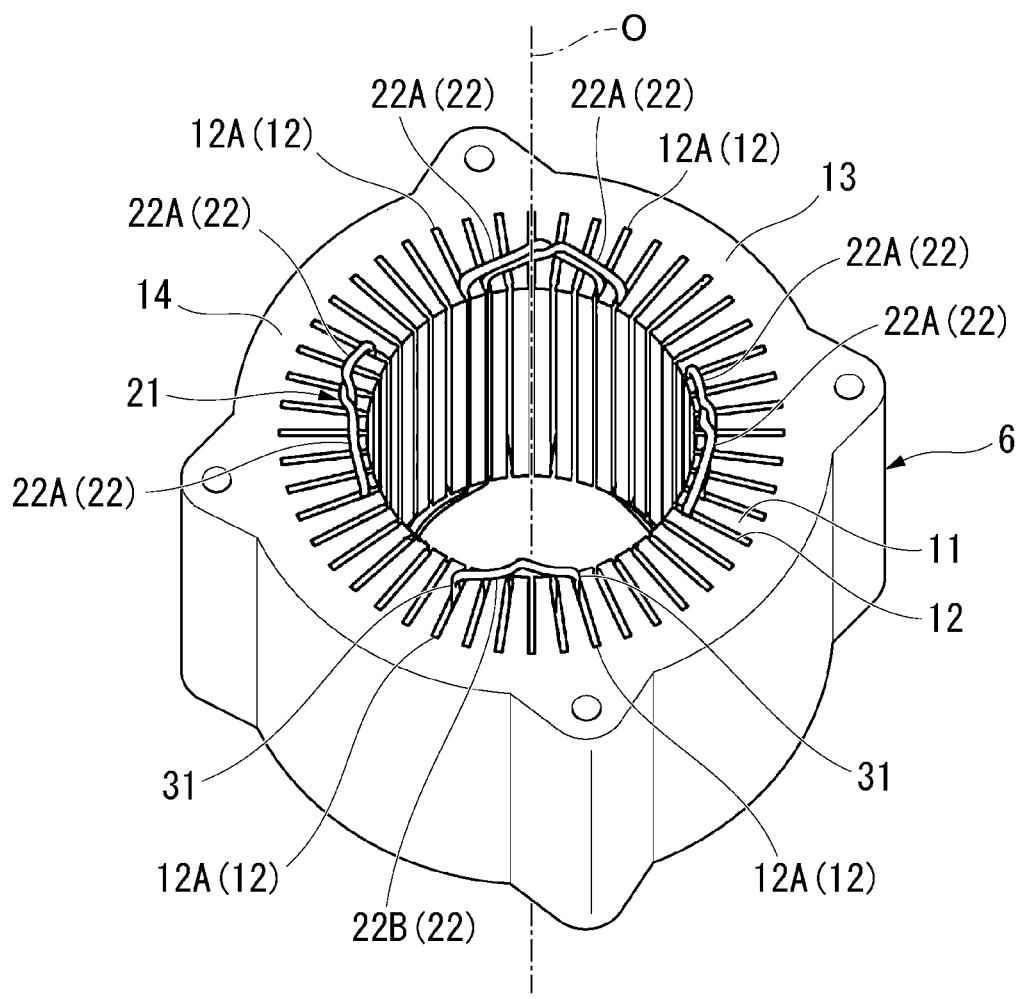

As illustrated in FIGS. 1 and 4, the stator core 6 is formed in a cylindrical shape centered on the axis O. The rotor 2 described above is rotatably accommodated inside the stator core 6. As illustrated in FIG. 4, the stator core 6 includes a plurality of teeth 11 and a plurality of slots 12.

The plurality of teeth 11 and the plurality of slots 12 are alternately formed in a circumferential direction of the stator core 6. The plurality of teeth 11 have the same shape and size. Each of the teeth 11 is formed such that the width thereof in the circumferential direction of the stator core 6 is decreased as each of the teeth 11 extends inward in a radial direction of the stator core 6. Accordingly, the width of each of the slots 12 in the circumferential direction of the stator core 6 is constant in the radial direction of the stator core 6. In addition, the interval between two slots 12 adjacent to each other in the circumferential direction of the stator core 6 is decreased as the slots extend inward in the radial direction of the stator core 6. The plurality of slots 12 are arranged at equal intervals in the circumferential direction of the stator core 6. In the following description, the interval between the two slots 12 adjacent to each other in the circumferential direction may be referred to as a pitch.

In the rotary electric machine 1 of the present embodiment configured as a three-phase motor, the plurality of teeth 11 and slots 12 are alternately formed at equal intervals in the circumferential direction.

Figure 7:
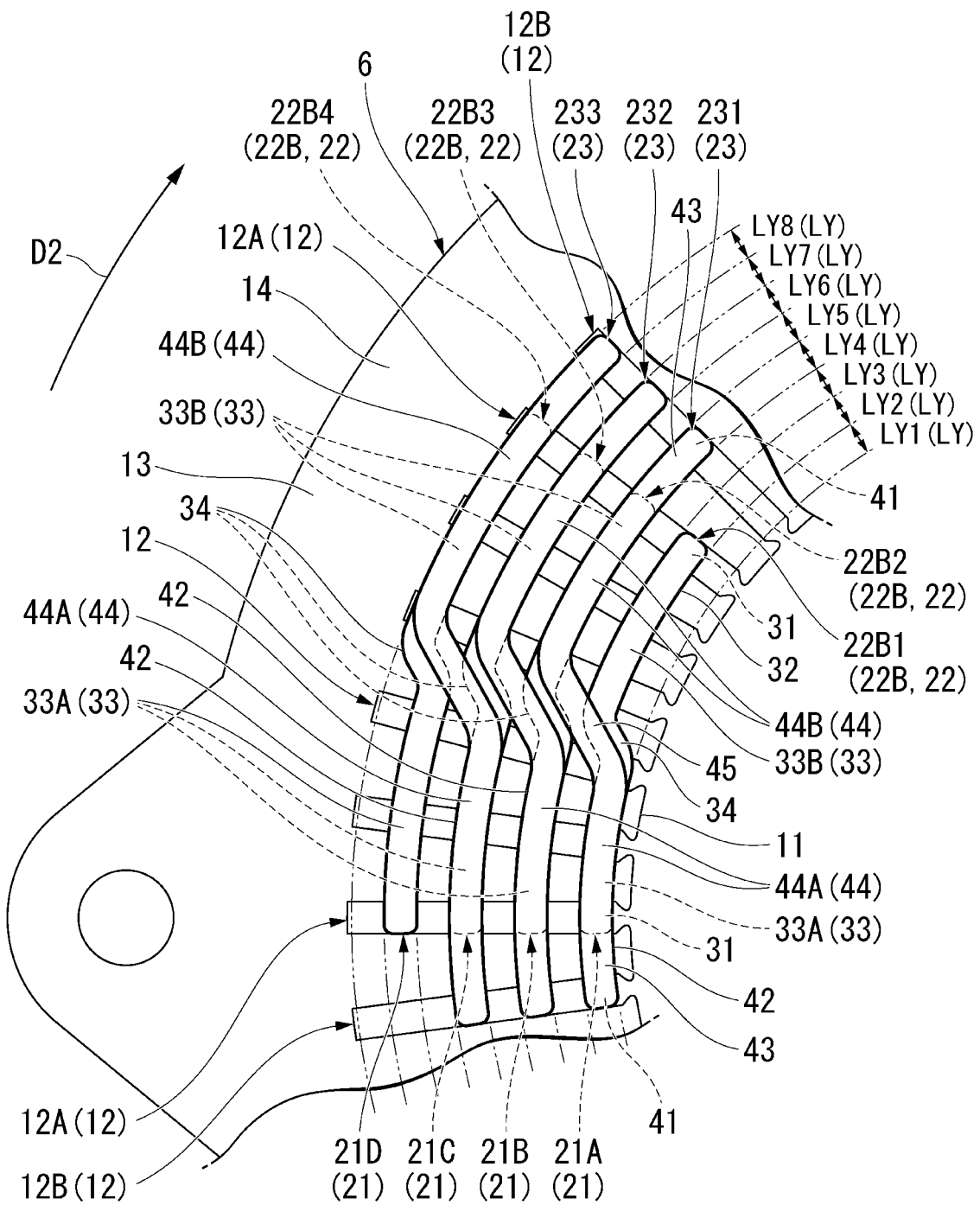
FIG. 7 is a plan view illustrating a relative positional relationship between the stator core, the basic coil segment, and the transition coil segment in the stator of FIG. 2 when seen in an axial direction of the stator core.

As illustrated in FIG. 7, each of the slots 12 has a plurality of insertion regions LY arranged in the radial direction of the stator core 6. One of legs 31 and 41 of coil segments 22 and 23 to be described later is inserted into each of the insertion regions LY. Namely, in each of the slots 12, a plurality of the legs 31 and 41 are arranged in the radial direction of the stator core 6. In the present embodiment, eight insertion regions LY1 to LY8 are arranged in the radial direction of the stator core 6. In the following description, each of the insertion regions LY is referred to as a layer LY. In addition, eight layers LY1 to LY8 arranged in the radial direction of the stator core 6 are referred to as a first layer LY1, a second layer LY2, . . . , and an eighth layer LY8 in order from an inner side in the radial direction of the stator core 6.

As illustrated in FIGS. 4 and 7, the stator core 6 further includes a yoke 13 that is formed in a cylindrical shape to integrally connect the plurality of teeth 11. The yoke 13 is connected to ends of the plurality of teeth 11, the ends being located on an outer side in the radial direction of the stator core 6.

The stator core 6 is formed, for example, by stacking a plurality of electromagnetic steel plates in an axis O direction. The stator core 6 may be formed by powder molding.

<Coil>

As illustrated in FIG. 2, the stator 3 of the present embodiment includes the coils 7 of three phases. Each of the coils 7 is wound around the plurality of slots 12 in wave form at a predetermined pitch. In the present embodiment, the same coil 7 passes through the slots 12 located apart from each other by a predetermined pitch, so that the same coil 7 is wound in wave form.

Figure 3:
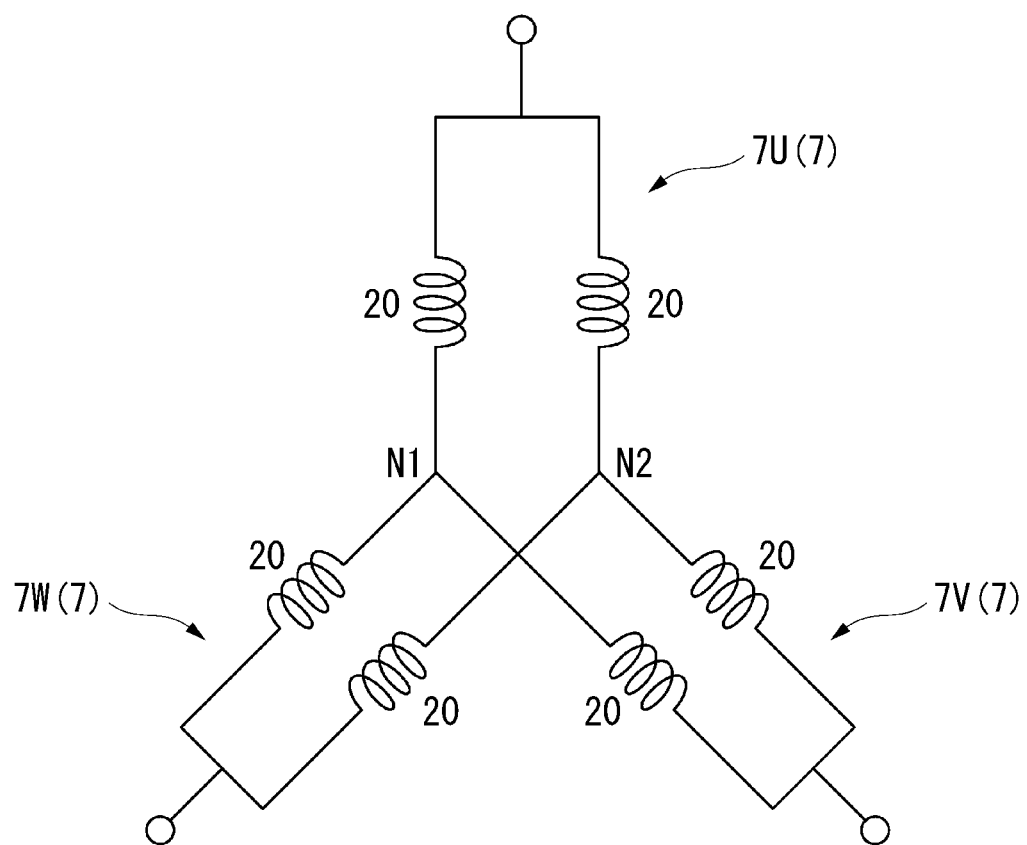
FIG. 3 is a circuit diagram illustrating a three-phase alternating circuit in the stator of FIG. 2.

As illustrated in FIG. 3, the coils 7 of three phases form a three-phase alternating circuit. The coil 7 of each phase includes two parallel coils 20 connected in parallel. The three-phase alternating circuit in the present specification adopts double star connection by which the coils 7 of three phases are connected at neutral points N1 and N2. Incidentally, in FIGS. 2 and 3, separate reference signs 7U, 7V, and 7W are assigned to the coils 7 of three phases. The parallel coil 20 of each phase includes a basic coil segment 22 illustrated in FIG. 5 and a transition coil segment 23 illustrated in FIG. 6.

<Basic Coil Segment>

Figure 5:
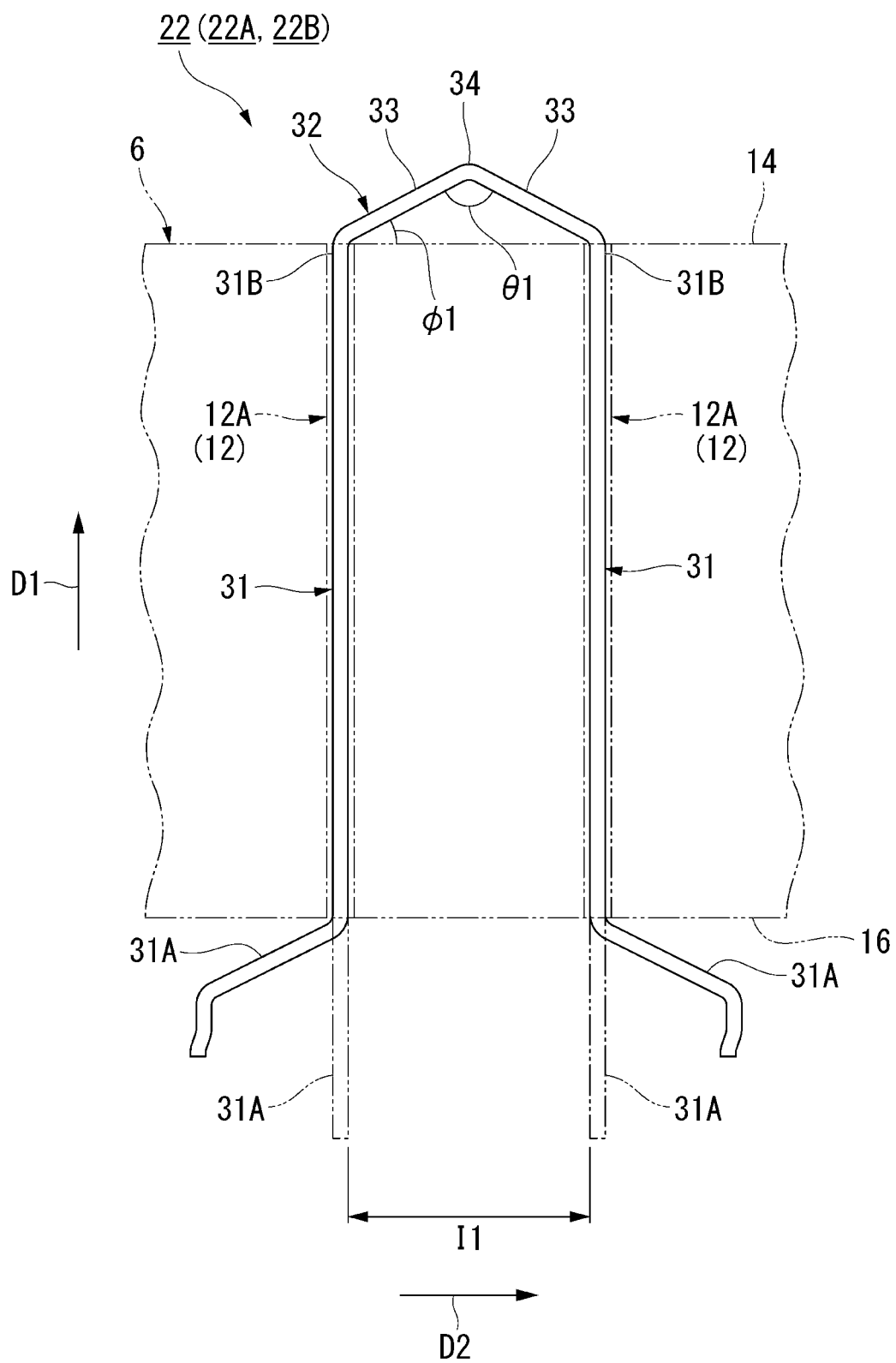
FIG. 5 is a front view illustrating the basic coil segment forming the stator of FIG. 2.

As illustrated in FIG. 5, the basic coil segment 22 is formed by bending a rectangular wire having a substantially quadrilateral cross section. The basic coil segment 22 may be made of a round wire having a circular cross section. The basic coil segment 22 includes a pair of first legs 31 that extend parallel to each other, and a first transition portion 32 that connects the pair of first legs 31.

As illustrated in FIGS. 4 and 5, the pair of first legs 31 extend in the axial direction of the stator core 6. The pair of first legs 31 are inserted into a pair of first slots 12A located apart from each other by a first interval I1 in the circumferential direction of the stator core 6.

Figure 6:
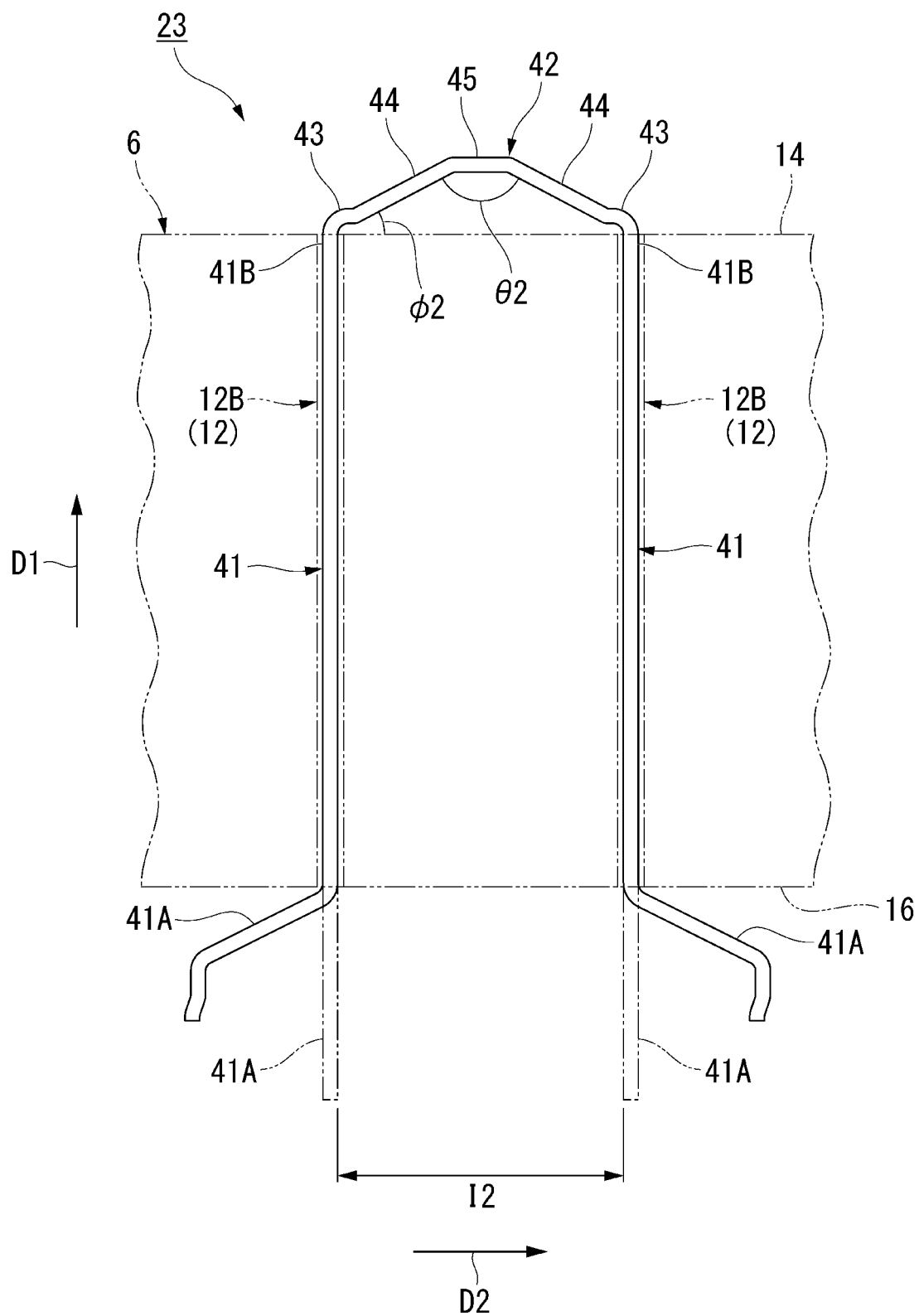
FIG. 6 is a front view illustrating a transition coil segment forming the stator of FIG. 2.

Incidentally, in the present specification, the axial direction refers to a direction illustrated by arrow D1 of FIGS. 5 and 6. In addition, the circumferential direction refers to a direction illustrated by arrow D2 of FIGS. 5 and 6.

Namely, the pair of first legs 31 are located apart from each other by the first interval I1. The pair of first legs 31 are inserted into the first slots 12A from a first end surface 14 side in the axial direction of the stator core 6. In a state where the pair of first legs 31 are inserted into the first slots 12A, first end portions 31A in an extending direction of the pair of first legs 31 protrude from a second end surface 16 in the axial direction of the stator core 6.

The first end portions 31A of the pair of first legs 31 are bent such that the interval between the pair of first legs 31 is widened. The first end portions 31A of the pair of first legs 31 are portions in which the coil segments 22 and 23 which are separate are welded together. The bending of the first end portions 31A of the pair of first legs 31 is performed after the basic coil segment 22 is attached to the stator core 6. Namely, in a state before the basic coil segment 22 is attached to the stator core 6, the first end portions 31A of the pair of first legs 31 are formed parallel to each other as illustrated by alternate long and short dashes lines in FIG. 5.

Both ends in a longitudinal direction of the first transition portion 32 are connected to second end portions 31B of the extending direction of the first legs 31. The first transition portion 32 is disposed on the first end surface 14 side of the stator core 6 in a state where the pair of first legs 31 are inserted into the pair of first slots 12A.

The first transition portion 32 includes a pair of first rising portions 33. The pair of first rising portions 33 extend obliquely to be apart from a first end surface 14 in the axial direction of the stator core 6 while the pair of first rising portions 33 approach each other from the first legs 31 in the circumferential direction of the stator core 6. Tips in an extending direction of the pair of first rising portions are connected to each other. Namely, the first transition portion 32 is formed in a shape bent in an L shape at a predetermined opening angle θ1. The predetermined opening angle θ1 may be 180° or less. Then, the tip portions of the pair of first rising portions, the tip portions being connected to each other, become a top 34 of the first transition portion 32.

In addition, as illustrated in FIG. 7, the first transition portion 32 is bent such that the pair of first rising portions 33 are located offset from each other in the radial direction of the stator core 6 when seen in the axial direction of the stator core 6. Accordingly, the pair of first rising portions 33 are located offset from each other in the radial direction of the stator core 6 to correspond to two layers LY adjacent to each other. In addition, the pair of first legs 31 described above are inserted into two layers LY, which are adjacent to each other in the radial direction of the stator core 6, in the pair of first slots 12A located apart from with other by the predetermined pitch.

As illustrated in FIG. 4, the parallel coil 20 illustrated in FIG. 3 includes a plurality of the basic coil segments 22. The plurality of basic coil segments 22 are arranged in the circumferential direction of the stator core 6, and the first end portions 31A of the first legs 31 of the basic coil segments 22 are welded together, so that the basic coil segments 22 are connected in series to form a coil having a waveform shape. The parallel coil 20 includes a plurality of coil units 21 in which the plurality of basic coil segments 22 are connected in series as described above. Although not illustrated in FIG. 4, the plurality of coil units 21 are arranged in the radial direction of the stator core 6. In the present embodiment, the parallel coil 20 includes four coil units 21.

As illustrated in FIGS. 4 and 5, the basic coil segment 22 forming the parallel coil 20 includes a main coil segment 22A and a sub-coil segment 22B. The first interval I1 between the pair of first legs 31 of the sub-coil segment 22B is smaller than the first interval I1 between the pair of first legs 31 of the main coil segment 22A. Specifically, the first interval I1 between the pair of first legs 31 of the main coil segment 22A corresponds to the interval between the pair of first slots 12A located apart from each other by six pitches. The first interval I1 between the pair of first legs 31 of the sub-coil segment 22B corresponds to the interval between the pair of first slots 12A located apart from each other by five pitches.

In the present embodiment, as illustrated in FIG. 7, a first sub-coil segment 22B1, a second sub-coil segment 22B2, a third sub-coil segment 22B3, and a fourth sub-coil segment 22B4 are arranged in order from the inner side to the outer side in the radial direction of the stator core 6. In FIG. 7, four sub-coil segments 22B1 to 22B4 correspond to four coil units 21A to 21D, respectively. The pair of first slots 12A into which the pair of first legs 31 of each of the sub-coil segments 22B are inserted are the same between a plurality of the sub-coil segments 22B1 to 22B4.

In each of the sub-coil segments 22B, one first rising portion 33A located in the layer LY on the inner side in the radial direction of the stator core 6 and the other first rising portion 33B located in the layer LY on the outer side in the radial direction are arranged in order on one side in the circumferential direction of the stator core 6. The one side in the circumferential direction of the stator core 6 is a direction illustrated in arrow D2 in FIG. 7.

Specifically, in the first sub-coil segment 22B1, the one first rising portion 33A is located in the first layer LY1, and the other first rising portion 33B is located in the second layer LY2. In the second sub-coil segment 22B2, the one first rising portion 33A is located in the third layer LY3, and the other first rising portion 33B is located in the fourth layer LY4. In the third sub-coil segment 22B3, the one first rising portion 33A is located in the fifth layer LY5, and the other first rising portion 33B is located in the sixth layer LY6. In the fourth sub-coil segment 22B4, the one first rising portion 33A is located in the seventh layer LY7, and the other first rising portion 33B is located in the eighth layer LY8.

<Transition Coil Segment>

The transition coil segment 23 connects the coil units 21 described above. As illustrated in FIG. 6, the transition coil segment 23 is formed by bending the same wire rod (for example, a rectangular wire or as round wire) as that of the basic coil segment 22. The transition coil segment 23 includes a pair of second legs 41 that extend parallel to each other, and a second transition portion 42 that connects the pair of second legs 41.

The pair of second legs 41 extend in the axial direction of the stator core 6 to be inserted into a pair of second slots 12B located apart from each other by a second interval I2 in the circumferential direction of the stator core 6. Namely, the pair of second legs 41 are located apart from each other by the second interval I2. The second interval I2 between the pair of second slots 12B is wider than the first interval I1 between the pair of first slots 12A illustrated in FIG. 5. In the present embodiment, as illustrated in FIG. 7, the second interval I2 between the pair of second legs 41 corresponds to the interval between the pair of second slots 12B located apart from each other by seven pitches.

As illustrated in FIG. 6, the pair of second legs 41 are inserted into the second slots 12B from the first end surface 14 side in the axial direction of the stator core 6. In a state where the pair of second legs 41 are inserted into the second slots 12B, first end portions 41A in an extending direction of the pair of second legs 41 protrude from the second end surface 16 in the axial direction of the stator core 6.

The first end portions 41A of the pair of second legs 41 are bent such that the interval between the pair of second legs 41 is widened. The first end portions 41A of the pair of second legs 41 are portions in which the coil segments 22 and 23 which are separate are welded together. The bending of the first end portion 41A of the pair of second legs 41 is performed after the transition coil segment 23 is attached to the stator core 6. Namely, in a state before the transition coil segment 23 is attached to the stator core 6, the first end portions 41A of the pair of second legs 41 are formed parallel to each other as illustrated by alternate long and short dashes lines in FIG. 6.

Both ends in a longitudinal direction of the second transition portion 42 are connected to second end portions 41B of the extending direction of the second legs 41. The second transition portion 42 is disposed on the first end surface 14 side of the stator core 6 in a state where the pair of second legs 41 are inserted into the pair of second slots 12B.

The second transition portion 42 includes a pair of shoulders 43 and a pair of second rising portions 44. In addition, the second transition portion 42 of the present embodiment also includes a flat portion 45.

The pair of shoulders 43 extend from the second legs 41 in a direction to approach each other in the circumferential direction of the stator core 6. In the present embodiment, the pair of shoulders 43 extend obliquely at a predetermined angle larger than 0 degrees, to be apart from the first end surface 14 of the stator core 6. The angle of the shoulder 43 is smaller than an inclination angle $\varphi 1$ at which the first rising portion 33 of the basic coil segment 22 is inclined with respect to the first end surface 14 of the stator core 6. Incidentally, the pair of shoulders 43 may extend parallel to the first end surface 14 of the stator core 6, namely, the angle of the shoulder 43 may be 0 degrees.

The pair of second rising portions 44 extend obliquely to be apart from the first end surface 14 in the axial direction of the stator core 6 while the pair of second rising portions 44 approach each other from tips in an extending direction of the shoulders 43. An inclination angle $\varphi 2$ of the second rising portion 44 is larger than the angle of the shoulder 43 described above with respect to the first end surface 14 of the stator core 6. Namely, the inclination angle $\varphi 2$ of the second rising portion 44 may be larger than at least 0 degrees.

The inclination angle $\varphi 2$ of the second rising portion 44 is the same as the inclination angle $\varphi 1$ of the first rising portion 33 of the basic coil segment 22. Namely, an opening angle $\theta 2$ formed by the pair of second rising portions 44 is the same as the opening angle $\theta 1$ formed by the pair of first rising portions 33. For example, the inclination angle $\varphi 2$ of the second rising portion 44 may be larger than the inclination angle $\varphi 1$ of the first rising portion 33. Namely, the opening angle $\theta 2$ formed by the pair of second rising portions 44 may be smaller than the opening angle $\theta 1$ formed by the pair of first rising portions 33.

Tips in an extending direction of the pair of second rising portions 44 are connected to each other via the flat portion 45. For example, the tips in the extending direction of the pair of second rising portions 44 may be directly connected without any intervention.

The flat portion 45 connects the tips in the extending direction of the pair of second rising portions 44. The flat portion 45 extends parallel to the first end surface 14 of the stator core 6. In the present specification, a configuration where the flat portion 45 extends parallel to the first end surface 14 of the stator core 6 includes a case where the flat portion 45 extends slightly obliquely with respect to the first end surface 14.

As illustrated in FIG. 7, the second transition portion 42 is bent such that the pair of second rising portions 44 are located offset from each other in the radial direction of the stator core 6 when seen in the axial direction of the stator core 6. Accordingly, the pair of second rising portions 44 are located in two layers LY located apart from each other by two or more layers in the radial direction of the stator core 6. In addition, the pair of second legs 41 are inserted into the two layers LY, which are located apart from each other by two or more layers in the radial direction of the stator core 6, in the pair of second slots 12B located apart from each other by a predetermined pitch.

Specifically, the pair of second rising portions 44 are located in two layers LY located apart from each other by three layers in the radial direction of the stator core 6. For example, when one second rising portion 44A is located in the first layer LY1, the other second rising portion 44B is located in the fourth layer LY4. For example, the pair of second rising portions 44 may be located in two layers LY located apart from each other by one or two layers in the radial direction of the stator core 6.

In addition, the flat portion 45 extends outward in the radial direction of the stator core 6 as extending in the circumferential direction of the stator core 6.

In the present embodiment, as illustrated in FIG. 7, a first transition coil segment 231, a second transition coil segment 232, and a third transition coil segment 233 are arranged in order from the inner side to the outer side in the radial direction of the stator core 6. The pair of second slots 12B into which the pair of second legs 41 of each of the transition coil segments 23 are inserted are the same between a plurality of the transition coil segments 23.

In each of the transition coil segments 23, the one second rising portion 44A located in the layer LY on the inner side in the radial direction of the stator core 6 and the other second rising portion 44B located in the layer LY on the outer side in the radial direction are arranged in order on the one side in the circumferential direction of the stator core 6. Specifically, in the first transition coil segment 231, the one second rising portion 44A is located in the first layer LY1, and the other second rising portion 44B is located in the fourth layer LY4. In the second transition coil segment 232, the one second rising portion 44A is located in the third layer LY3, and the other second rising portion 44B is located in the sixth layer LY6. In the third transition coil segment 233, the one second rising portion 44A is located in the fifth layer LY5, and the other second rising portion 44B is located in the eighth layer LY8.

<Operation and Effects>

Figure 8:
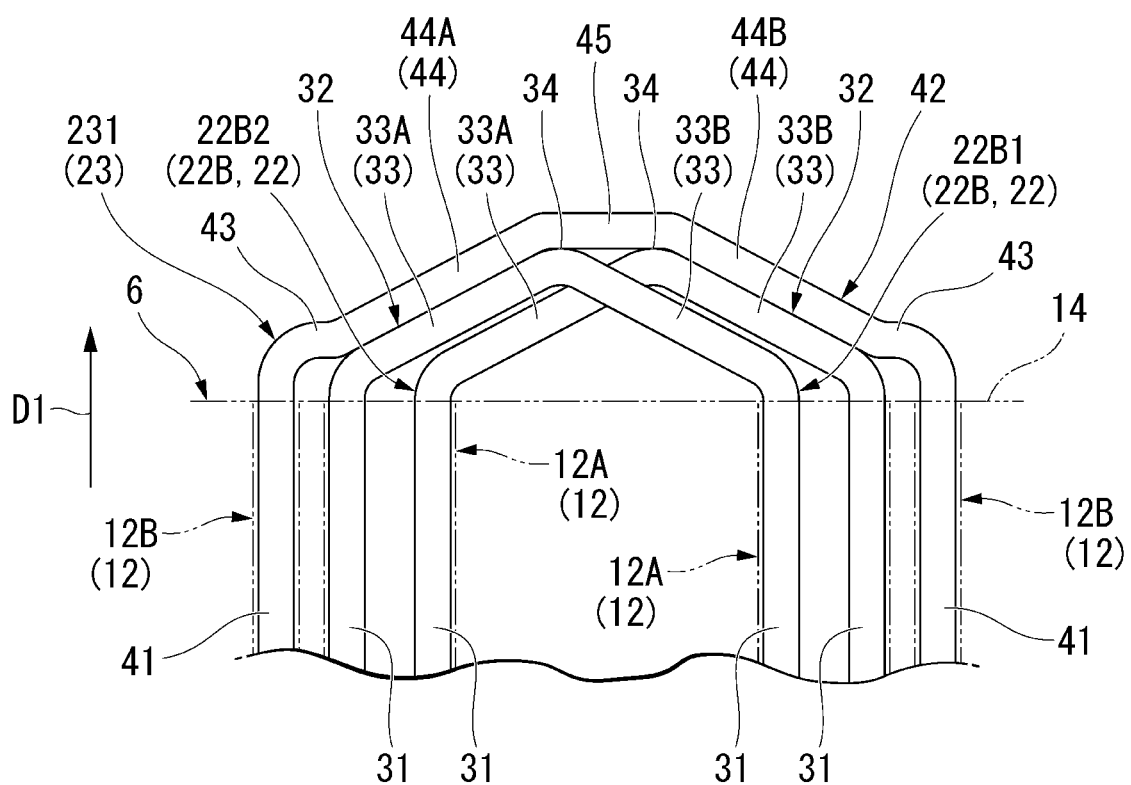
FIG. 8 is a view schematically illustrating a relative positional relationship between the basic coil segment and the transition coil segment in the stator of FIG. 2 when seen in a radial direction of the stator core.

In the stator 3 of the present embodiment, as illustrated in FIGS. 7 and 8, the pair of first legs 31 of the sub-coil segment 22B (basic coil segment 22) are inserted into the pair of first slots 12A. In addition, the pair of second legs 41 of the transition coil segment 23 are inserted into the pair of second slots 12B located to interpose the pair of first slots 12A therebetween in the circumferential direction of the stator core 6. For this reason, the second transition portion 42 of the transition coil segment 23 is disposed such that the first transition portion 32 of the sub-coil segment 22B (basic coil segment 22) is located between the second transition portion 42 and the first end surface 14 in the axial direction of the stator core 6. Then, the inclination angle $\varphi 2$ of the second rising portion 44 of the transition coil segment 23 is larger than the angle of the shoulder 43, so that the second transition portion 42 of the transition coil segment 23 is in contact with the first transition portion 32 of the sub-coil segment 22B.

Hereinafter, this point will be specifically described.

The one first rising portion 33A of one sub-coil segment 22B is located between the one second rising portion 44A of one transition coil segment 23 and the first end surface 14 of the stator core 6. In addition, the other first rising portion 33B of the other sub-coil segment 22B, which is adjacent to an outer side in the radial direction of the one sub-coil segment 22B, is located between the other second rising portion 44B of the one transition coil segment 23 and the first end surface 14 of the stator core 6. Further, the tops 34 of two sub-coil segments 22B adjacent to each other in the radial direction of the stator core 6 are located between the flat portion 45 of the one transition coil segment 23 and the first end surface 14 of the stator core 6.

For example, the one first rising portion 33A of the first sub-coil segment 22B1 is located between the one second rising portion 44A of the first transition coil segment 231 and the first end surface 14 of the stator core 6. In addition, the other first rising portion 33B of the second sub-coil segment 22B2 is located between the other second rising portion 44B of the first transition coil segment 231 and the first end surface 14 of the stator core 6. In addition, the tops 34 of the first and second sub-coil segments 22B1 and 22B2 are located between the flat portion 45 of the first transition coil segment 231 and the first end surface 14 of the stator core 6.

The same positional relationship between the first transition coil segment 231 and the first and second sub-coil segments 22B1 and 22B2 also applies between the second transition coil segment 232 and the second and third sub-coil segments 22B2 and 22B3 and between the third transition coil segment 233 and the third and fourth sub-coil segments 22B3 and 22B4.

Then, the inclination angle φ2 of the second rising portion 44 with respect to the first end surface 14 of the stator core 6 is larger than the angle of the shoulder 43 with respect to the first end surface 14 of the stator core 6, so that the height position of the second transition portion 42 with respect to the first end surface 14 of the stator core 6 is decreased. In addition, the pair of second rising portions 44 are located close to each other in the circumferential direction of the stator core 6. Accordingly, the second transition portion 42 of the transition coil segment 23 is in contact with the first transition portion 32 of the sub-coil segment 22B.

In the present embodiment, the one first rising portion 33A of one sub-coil segment 22B is in contact with the one second rising portion 44A of one transition coil segment 23. In addition, the other second rising portion 44B of the one transition coil segment 23 and the other first rising portion 33B of the other sub-coil segment 22B are in contact with each other. Here, since the inclination angle φ1 of the first rising portion 33 of the sub-coil segment 22B and the inclination angle φ2 of the second rising portion 44 of the transition coil segment 23 are equal to each other, the second rising portion 44 is in parallel contact with the first rising portion 33.

In addition, the flat portion 45 of the one transition coil segment 23 is in contact with the tops 34 of two sub-coil segments 22B adjacent to each other in the radial direction of the stator core 6.

More specifically, the one second rising portion 44A of the first transition coil segment 231 is in parallel contact with the one first rising portion 33A of the first sub-coil segment 22B1. In addition, the other second rising portion 44B of the first transition coil segment 231 is in parallel contact with the other first rising portion 33B of the second sub-coil segment 22B2.

In addition, the tops 34 of the first and second sub-coil segments 22B1 and 22B2 are in contact with the flat portion 45 of the first transition coil segment 231.

The same mode of contact described above between the second transition portion 42 of the first transition coil segment 231 and the first transition portions 32 of the first and second sub-coil segments 22B1 and 22B2 also applies between the second transition portion 42 of the second transition coil segment 232 and the first transition portions 32 of the second and third sub-coil segments 22B2 and 22B3 and between the second transition portion 42 of the third transition coil segment 233 and the first transition portions 32 of the third and fourth sub-coil segments 22B3 and 22B4.

As described above, according to the stator 3 and the rotary electric machine 1 including the same according to the present embodiment, the first transition portion 32 of the sub-coil segment 22B is disposed between the first end surface 14 of the stator core 6 and the second transition portion 42 of the transition coil segment 23, and is in contact with the second transition portion 42 of the transition coil segment 23. Accordingly, when the legs 31 and 41 of the coil segments 22 and 23 which are separate are welded together, the first transition portion 32 of the sub-coil segment 22B can be reliably pressed toward the first end surface 14 of the stator core 6 simply by pressing the second transition portion 42 of the transition coil segment 23 toward the first end surface 14 of the stator core 6. All the coil segments 22 and 23 are pressed toward the first end surface 14 of the stator core 6, so that the positions of welding portions in the axial direction of the stator core 6 can be effectively suppressed from varying between a plurality of the welding portions in which two legs 31 and 41 which are separate are welded together.

In addition, according to the stator 3 and the rotary electric machine 1 according to the present embodiment, the second transition portion 42 of the transition coil segment 23 includes the flat portion 45 that is located between the tips of the pair of second rising portions 44 and is parallel to the first end surface 14 of the stator core 6. Accordingly, even when the second transition portion 42 of one transition coil segment 23 is disposed to overlap the first transition portions 32 of a plurality of the sub-coil segments 22B, the tops 34 of the plurality of sub-coil segments 22B can be in contact with the same second transition portion 42.

In addition, when the second transition portion 42 of the transition coil segment 23 includes the flat portion 45, the height position of the top of the second transition portion 42 of the transition coil segment 23 with respect to the first end surface 14 of the stator core 6 is lower than when the flat portion 45 is not provided. Accordingly, the top 34 of the sub-coil segment 22B can be more reliably in contact with the flat portion 45 of the second transition portion 42 of the transition coil segment 23.

In addition, according to the stator 3 and the rotary electric machine 1 according to the present embodiment, the second rising portion 44 of the transition coil segment 23 is in parallel contact with the first rising portion 33 of the sub-coil segment 22B. Namely, the first rising portion 33 and the second rising portion 44 are in line contact with each other. For this reason, when the second transition portion 42 of the transition coil segment 23 is pressed toward the first end surface 14 of the stator core 6, the first transition portion 32 of the sub-coil segment 22B can be stably pressed toward the first end surface 14 of the stator core 6. In addition, when the second transition portion 42 of the transition coil segment 23 is pressed toward the first end surface 14 of the stator core 6, the first transition portion 32 or the second transition portion 42 can be suppressed from being deformed.

<Other embodiments>

The embodiment of the present invention has been described above; however, the present invention is not limited thereto, and modifications can be appropriately made without departing from the technical concept of the invention.

In the stator of the present invention, for example, the second transition portion 42 of the transition coil segment 23 may be disposed such that the first transition portion 32 of the main coil segment 22A is located between the second transition portion 42 and the first end surface 14 in the axial direction of the stator core 6. Namely, the second transition portion 42 of the transition coil segment 23 may be in contact with the first transition portion 32 of the main coil segment 22A. Even in this case, the same effects as those of the embodiment can be obtained.

In the stator of the present invention, the number of the insertion regions LY may be a number other than 8. The present invention can be also applied to a stator having, for example, four, six, ten, twelve or more insertion regions LY.

The rotary electric machine of the present invention is not limited to a motor that causes an alternating current to flow through the coils 7 of the stator 3 to drive the rotor 2 to rotate, and may be a generator that generates electric power when the rotor 2 is rotated by power of an engine or the like.

The rotary electric machine of the present invention is suitable as a rotary electric machine used in work machines such as a hydraulic excavator, a bulldozer, and a forklift.

INDUSTRIAL APPLICABILITY

According to the present invention, the first transition portion of the basic coil segment can be reliably pressed toward the first end surface of the stator core simply by pressing the second transition portion of the transition coil segment toward the first end surface of the stator core.

The invention claimed is:

1. A stator comprising:
a stator core including a plurality of teeth and a plurality of slots; and
a coil wound around the plurality of slots at a predetermined pitch,
wherein the coil includes
a basic coil segment including a pair of first legs that are inserted into a pair of first slots located apart from each other by a first interval in a circumferential direction of the stator core, and a first transition portion that connects the pair of first legs and is disposed on a side of a first end surface in an axial direction of the stator core, and
a transition coil segment including a pair of second legs that are inserted into a pair of second slots located apart from each other in the circumferential direction by a second interval wider than the first interval, and a second transition portion that connects the pair of second legs and is disposed such that the first transition portion is located between the second transition portion and the first end surface in the axial direction,
the first transition portion of the basic coil segment includes a pair of first rising portions that extend obliquely to be apart from the first end surface in the axial direction while the pair of first rising portions approach each other from the first legs in the circumferential direction,
the second transition portion of the transition coil segment includes a pair of shoulders that extend from the second legs in a direction to approach each other, and a pair of second rising portions that extend obliquely to be apart from the first end surface in the axial direction while the pair of second rising portions approach each other from tips in an extending direction of the shoulders, and
an inclination angle of the second rising portion with respect to the first end surface is larger than an angle of the shoulder with respect to the first end surface, so that the second transition portion is in contact with the first transition portion.

2. The stator according to claim 1,
wherein the second transition portion includes a flat portion that connects tips in an extending direction of the pair of second rising portions and extends parallel to the first end surface of the stator core, and
the flat portion is in contact with tips in an extending direction of the first rising portions of a plurality of the basic coil segments.

3. The stator according to claim 1,
wherein the second rising portion of the second transition portion is in parallel contact with the first rising portion of the first transition portion.

4. The stator according to claim 1,
wherein the plurality of slots each have a plurality of layers arranged in a radial direction of the stator core,
one first leg or one second leg is inserted into each of the layers,
the pair of first legs of the basic coil segment are inserted into two layers adjacent to each other in the radial direction, and
the pair of second legs of the transition coil segment are inserted into two layers located apart from each other by two or more layers in the radial direction.

5. A rotary electric machine comprising:
a rotor; and
the stator according to claim 1, the stator accommodating the rotor.

6. A work machine comprising:
the rotary electric machine according to claim 5.

* * * * *